(12) United States Patent
Winter et al.

(10) Patent No.: US 7,385,550 B2
(45) Date of Patent: Jun. 10, 2008

(54) METHOD FOR MEASURING DISTANCES AND SPEEDS OF SEVERAL OBJECTS BY MEANS OF AN FMCW RADAR

(75) Inventors: Klaus Winter, Schwieberdingen (DE); Dirk Ulbricht, Wangen (DE)

(73) Assignee: Robert Bosch GmbH, Stuttgart (DE)

( * ) Notice: Subject to any disclaimer, the term of this patent is extended or adjusted under 35 U.S.C. 154(b) by 313 days.

(21) Appl. No.: 10/528,186

(22) PCT Filed: Mar. 14, 2003

(86) PCT No.: PCT/DE03/00821

§ 371 (c)(1),
(2), (4) Date: Sep. 2, 2005

(87) PCT Pub. No.: WO2004/029650

PCT Pub. Date: Apr. 8, 2004

(65) Prior Publication Data

US 2006/0109169 A1   May 25, 2006

(30) Foreign Application Priority Data

Sep. 20, 2002  (DE) ................................ 102 43 811

(51) Int. Cl.
*G01S 13/42*   (2006.01)
(52) U.S. Cl. .................. 342/70; 342/109; 342/115; 342/195
(58) Field of Classification Search .................. 342/70
See application file for complete search history.

(56) References Cited

U.S. PATENT DOCUMENTS 5,600,561 A    2/1997  Okamura
5,619,208 A    4/1997  Tamatsu et al.
5,625,362 A    4/1997  Richerdson (Continued)

FOREIGN PATENT DOCUMENTS

| JP | 11271432 | 10/1999 |
|---|---|---|
| JP | 2000 019245 | 1/2000 |
| WO | WO 150152 A1 * | 7/2001 |

OTHER PUBLICATIONS

"Adaptive Cruise Control," Automotive Electronics Handbook, published by Ronald K. Jurgen, 2nd edition, McGraw-Hill Inc., Chapter 30.1 (1999).

*Primary Examiner*—Thomas H. Tarcza
*Assistant Examiner*—Matthew M Barker
(74) *Attorney, Agent, or Firm*—Kenyon & Kenyon LLP

(57) ABSTRACT

Distance and velocity measuring at a plurality of objects using FMCW radar includes repeating measurements using different frequency ramps and including mixing transmitted and received signals, and recording the mixed signal's spectrum. A matching includes recording spectra peaks for ramps, if belonging to the same object, allocating them to each other, and calculating distances and velocities from peak frequencies. A tracking includes identifying with one another objects measured at various times based on distance and velocity consistency. Each measuring cycle includes less than four measurements with different frequency ramps. For each plausible two peak combination recorded, respectively, during first and second measurements of a cycle, distance and velocity of one possible object represented by these peaks are calculated. A measurement's anticipated result, is calculated from distance and velocity of the possible object, discarded if an anticipated result does not agree with the measured result.

5 Claims, 15 Drawing Sheets

U.S. PATENT DOCUMENTS

| | | |
|---|---|---|
| 5,963,162 A | 10/1999 | Iihoshi et al. |
| 6,317,073 B1 * | 11/2001 | Tamatsu et al. ............... 342/70 |
| 6,320,531 B1 * | 11/2001 | Tamatsu ..................... 342/109 |
| 6,469,656 B1 * | 10/2002 | Wagner et al. ................ 342/70 |
| 6,587,074 B1 * | 7/2003 | Winter et al. ................ 342/130 |
| 6,606,052 B1 * | 8/2003 | Miyahara ..................... 342/70 |
| 6,633,815 B1 * | 10/2003 | Winter et al. ................ 701/301 |
| 2003/0217880 A1 * | 11/2003 | Isogai et al. ................ 180/170 |

* cited by examiner

METHOD FOR MEASURING DISTANCES AND SPEEDS OF SEVERAL OBJECTS BY MEANS OF AN FMCW RADAR

FIELD OF THE INVENTION

The present invention relates to a method for measuring distance and velocity at a plurality of objects using FMCW radar.

BACKGROUND INFORMATION

Discussed herein is a method for measuring distance and velocity at a plurality of objects using FMCW radar, in which:
  measurements are repeated cyclically with at least two different frequency ramps,
  in each measurement, the transmitted signal is mixed with the received signal, and the spectrum of the mixed signal is recorded,
  in a matching procedure, the peaks that are in the spectra recorded for various ramps and that belong to the same object are allocated to each other, and the distances and velocities of the objects are calculated from the frequencies of the peaks, and
  in a tracking procedure, the objects measured at various times are identified with one another on the basis of the consistency of their distance and velocity data.

In particular, discussed herein is a method of this type which is used in ranging systems or distance-control systems for motor vehicles.

From practice, a distance-control system, a so-called ACC (adaptive cruise control) system for motor vehicles is known which works with an FMCW (frequency modulated continuous wave) radar. The functioning principle is described in Winner: "Adaptive Cruise Control", Automotive Electronics Handbook, published by Ronald K. Jurgen, 2$^{nd}$ edition, McGraw-Hill Inc., Chapter 30.1 (1999). The radar waves are emitted continuously, and the frequency is modulated in accordance with a ramp function made up of a cyclical sequence of four ramps having different slopes. The ramps form two pairs, each made up of a rising and a falling ramp. The amounts of the slopes are identical within each pair, but differ from pair to pair. By mixing the transmitted signal with the received signal, which is obtained by reflection of the radar waves at a plurality of objects, a low-frequency signal is formed whose frequency corresponds to the difference between the frequency of the transmitted signal and the frequency of the reflected signal. In each individual measurement, the spectrum of the low-frequency signal is recorded during the duration of one frequency ramp with constant slope. In this spectrum, each object is represented by a peak whose frequency f, according to the following equation, is a function of the distance d and the velocity v (relative velocity) of the object:

$$f=|(2*F/c*T)*d+(2*f_s/c)*v| \quad (1)$$

Meanings of equation terms:
f peak frequency in the low-frequency signal
F frequency deviation (frequency at the end of the ramp− frequency at the beginning of the ramp)
c speed of light
T modulation duration (of the ramp)
$f_s$ frequency of the transmitted signal
The first term in equation (1) is proportional to the signal propagation time, d/c and the ramp slope F/T. The second term corresponds to the Doppler shift of the reflected signal.

If only one reflecting object is present, distance d and relative velocity v of this object may be calculated from peak frequencies $f_1$ and $f_2$, which are obtained by two measurements with different ramp slopes. To that end, the following equation system is solved:

$$f_1 = \alpha*d + \beta*v$$

$$f_2 = \gamma*d + \beta*v \quad (2)$$

with:

$\alpha = 2*f/c*T$ for the first ramp, $\beta = 2*f_s/c$ $\gamma = 2*F/c*T$ for the second ramp Given a plurality of objects, however, ambiguities occur, because it is not clear which peak belongs to which object. In the known method, this ambiguity is eliminated by performing two additional measurements using a different ramp slope. Since the distances and relative velocities of the objects change slightly at most within the time in which the four measurements are performed, the allocation between the peaks and the objects must be carried out so that the same distances and relative velocities are obtained for the first two measurements as for the last two measurements. This allocation of the peaks to the objects is called matching.

For practical applications, for example, in an ACC system, it is generally necessary to be able to track the measured distances and relative velocities of the various objects over a longer period of time. Therefore, in a procedure known as tracking, the objects measured in one measuring cycle must be identified with the objects measured in a preceding cycle. This tracking procedure is based on the criterion that the distances and relative velocities for each object, measured at various times, must yield a plausible and, in particular, physically possible movement of the object.

The U.S. Pat. No. 5,600,561 discusses a method in which only the distances are measured with the aid of radar, and the object velocities are calculated from the changes in distance. The distances measured for various objects are allocated to the individual objects in such a way that the newly recorded distance data are consistent with the previously calculated velocities.

In contrast, an FMCW radar has the advantage that the relative velocities of the objects can be measured directly. However, it is only possible to differentiate various objects from each other both with respect to their distances and with respect to their relative velocities with a limited resolution.

SUMMARY OF THE INVENTION

An object of the present invention is to provide a method for measuring distance and velocity using FMCW radar that permits improved object resolution.

This objective may be achieved according to the present invention in a method of the type indicated at the outset, in that
  each measuring cycle includes not more than three measurements with different frequency ramps,
  for each plausible combination of two peaks, of which one was recorded during a first measurement and the other was recorded during a second measurement of the same cycle, the distance and the velocity of one possible object represented by these peaks are calculated, the anticipated result of at least one further measurement is calculated from the distance and the velocity of the possible object, and the possible object is discarded if at least one anticipated result does not agree with the measured result.

One reason for the limited resolution capability of FMCW radar is that the peaks occurring in the individual spectra each have a finite width. In this context, a "blur relation" exists between the width of these peaks and the time available for recording the spectra. If, for example, the low-frequency signals are sampled to obtain discrete spectra with a number n of sampling values, then sampling time T/n (T=modulation duration) is available for each sampling value. In this case, the resolution with respect to the distance is proportional to modulation amplitude F, and the resolution with respect to the relative velocity is proportional to modulation duration T.

Compared to the other method discussed above, the exemplary method of the present invention now has the advantage that not four, but rather at most three measurements are performed within each measuring cycle, so that given the same cycle duration, a greater modulation duration is available, and better resolution with respect to the relative velocity is achieved accordingly.

Ambiguities in the case of a plurality of objects are eliminated in the method according to the present invention by linking the matching procedure and the tracking procedure to each other. If m objects are in the locating range of the radar, during the first measurement, one obtains peaks at the frequencies f(1,i), i=1 . . . m, and during the second measurement, peak frequencies f(2,j), j=1, . . . , m are obtained. Each pair (i, j) of peaks is regarded as a possible object which can be assigned a distance $d_{i,j}$ and a relative velocity $v_{i,j}$. From the distance and relative velocity data thus obtained for each possible object, it is possible to calculate what result ought to be anticipated for this object in a further measurement. Depending on the embodiment variant of the method, this further measurement may be a distance and velocity measurement in a different measuring cycle or a third measurement within the same cycle, using a ramp slope different from the two first measurements. The anticipated result is then compared to the result actually obtained during the further measurement, and if these results do not match, the object in question is discarded. Therefore, only the distance and velocity data remain for those peak pairs which correspond to real objects.

In one specific embodiment, the measuring cycle includes only two measurements with equal and opposite ramp slopes. In the case of the given cycle duration, the modulation duration is then twice as great as for the conventional methods which work with four measurements. Accordingly, the resolution with respect to the relative velocities is improved by a factor of 2. Another advantage is that all measurements may be performed with a maximum frequency deviation, in which the available frequency range of the microwave transmitter is fully utilized. Correspondingly, a maximum resolution with respect to the distance is also achieved in each measurement, while when working with the conventional method, two of the four measurements had to be performed with a smaller ramp slope, and accordingly, with a smaller frequency deviation. Overall, therefore, given a relatively small cycle duration—and correspondingly high time resolution in the object search and object tracking—a high resolution may be achieved both with respect to the distance measurement and with respect to the relative-velocity measurement.

In this specific embodiment, the further measurement, whose result is compared to the anticipated result, is a distance and relative-velocity measurement in an earlier or later measuring cycle. The agreement of the results then means not only that the possible object in question is a real object, but at the same time means that the object was also identified with an object in the earlier or later measuring cycle, so that the tracking procedure was successful.

For example, from the distance measured in the current cycle and the appertaining relative velocity, it is calculated what distance the same object would have to have had in the immediately preceding measuring cycle. In so doing, it may be assumed in the simplest case that the change in relative velocity is negligibly small from measuring cycle to measuring cycle.

Alternatively, however, an expanded tracking procedure may also be used, in which not only the immediately preceding measuring cycle, but rather a larger number of previous measuring cycles is taken into account. It is possible that, because of interference effects, no echo was received from a real object within a single measuring cycle. In this case, the expanded tracking procedure with consideration of a plurality of measuring cycles offers the advantage that the object can nevertheless be recognized as a real object and successfully tracked.

Instead of calculating the anticipated distance and the anticipated relative velocity of the object for a previous measuring cycle and comparing them to the actually measured values, in a modified specific embodiment, it is also possible, from the data measured in the instantaneous cycle, to directly calculate the frequency at which the peak for this object ought to be found in the other (earlier or later) cycle. The result can then be very easily verified by specifically searching for a peak at this location. An expanded tracking with consideration of a plurality of measuring cycles is possible in this variant, as well.

In the specific embodiment of the method which works with three measurements within one measuring cycle, the third measurement which may have a greater modulation duration than the two first measurements. In this way, a particularly high resolution with respect to the relative velocity is achieved especially in the third measurement. It is again possible to also work with maximum frequency deviation in the third measurement, so that here as well, a maximum distance resolution is achieved in all measurements.

This specific embodiment may also be combined with the tracking, taking into account the immediately preceding measuring cycle or a plurality of preceding measuring cycles. For example, it can be required for real objects that the corresponding frequency was measured in two successive measurements in all three spectra. Alternatively, however, this method may also be combined with the tracking in such a way that the confirmation as to whether a real object is involved is carried out depending on the situation with the aid of the simple tracking, with the aid of the third frequency ramp, or with both. In this context, the third ramp and the tracking may also be linked by "or", so that an object is recognized as real if only one of the anticipated results is confirmed, be it the result for the previous measuring cycle or the result for the measurement with the third frequency ramp. An expanded tracking with consideration of more than two measuring cycles is possible in all combinations when working with these variants, as well.

DETAILED DESCRIPTION

Figure 1:
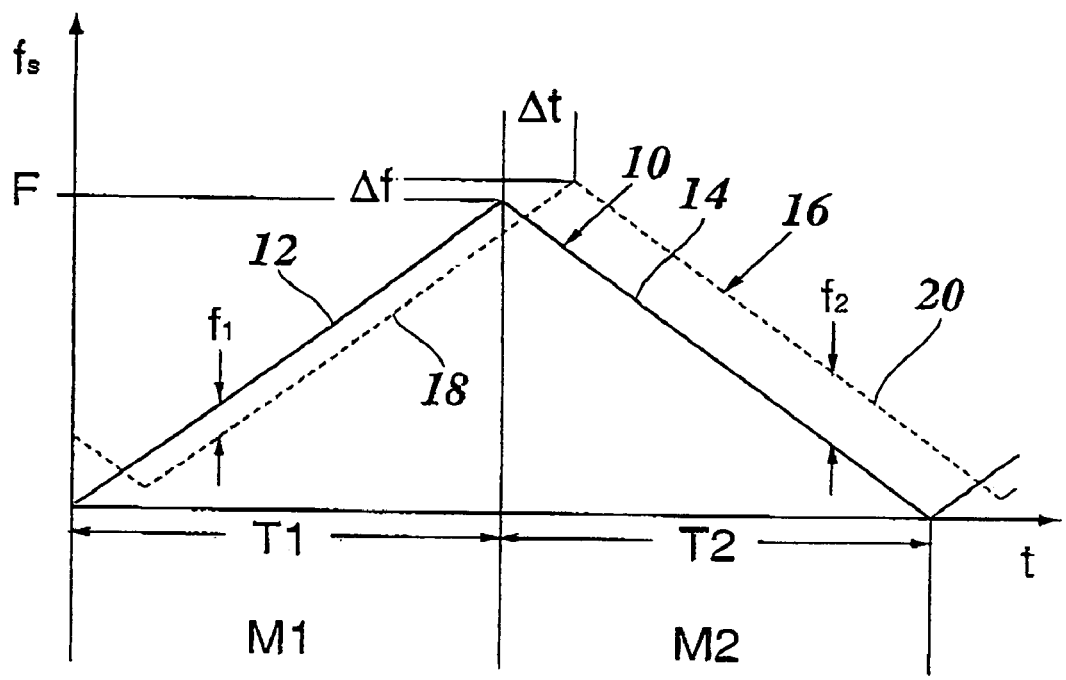
FIG. 1 shows a frequency/time diagram for clarifying the functioning method of an FMCW radar.

According to FIG. 1, when working with an FMCW radar, radar waves are continually emitted with variable frequency $f_s$. Curve 10 drawn in bold indicates the time dependency of frequency $f_s$. This frequency is varied periodically according to a ramp function having a rising first ramp 12 and a falling second ramp 14. Ramps 12, 14 belong to two measurements M1 and M2, which are repeated cyclically. The ramps for both measurements have the same frequency deviation F and identical modulation durations T1 and T2, and consequently their slopes are equal and opposite.

Frequency curve 16 for the associated radar echo of a single object is shown with a broken line. This curve has the same ramps 18 and 20, but with a time shift Δt, which is given by the object distance, and with a frequency shift Δf determined by the Doppler shift.

In the radar sensor, the emitted wave is mixed with the received radar echo, so that a low-frequency beat signal (LF signal) is obtained having a frequency f which corresponds to the frequency difference between the emitted waves and the received waves. During each measurement M1, M2, a frequency spectrum is recorded from this beat signal, e.g. by rapid Fourier transform.

Figure 2:
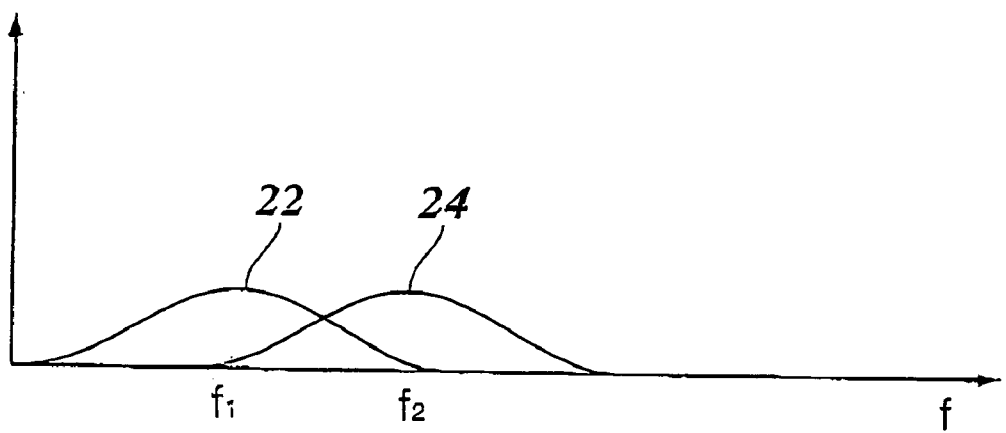
FIG. 2 shows examples for spectra that are recorded using the FMCW radar.

FIG. 2 shows examples for two frequency spectra 22, 24 obtained in the two measurements M1 and M2 when a single object, e.g. a preceding vehicle, is located in the radar locating range. In this case, each spectrum has a peak with an apex at the peak frequency $f_1$ and $f_2$, respectively, which corresponds to the frequency difference of curves 10 and 16 on respective ramps 12 and 18 or 14 and 20. The frequency difference is substantially dependent on the product of time shift Δt (signal propagation time) and the ramp slope; however during rising flanks 12, 18, it is reduced by the Doppler frequency, whereas during falling flanks 14, 20, it is increased by the Doppler frequency (given positive Doppler shift to greater frequencies, corresponding to an approach of the radar target). The average value of frequencies $f_1$ and $f_2$, at which the two peaks 22, 24 lie in FIG. 2, therefore corresponds to the signal propagation time, and thus indicates distance d of the object, while half the difference between these two frequencies indicates the Doppler shift, and therefore the amount and algebraic sign of relative velocity v of the object. Relative velocity v is proportional to $(f_1-f_2)/2$.

During the duration of a single measurement M1 or M2, the frequency of the LF-signal whose spectrum is shown in FIG. 2 is largely constant. Nevertheless, even given sharply defined object distances d and relative velocities v, peaks 22, 24 have a certain width which, because of the properties of the Fourier transform, is approximately inversely proportional to the measuring time. On its part, the measuring time available is proportional to modulation duration T1 and T2, respectively.

When, in the radar locating range, there are two objects whose peaks are so close to each other that their distance is small in relation to the width of the peaks, then the corresponding peaks in the spectrum can no longer be resolved, and consequently both objects can no longer be differentiated from each other. The more sharply the peaks are defined, i.e., the greater the modulation durations T1, T2, the better the resolution is.

The resolution with respect to the object distance may be improved by enlarging frequency deviation F. This shall be clarified with reference to FIGS. 3 and 4.

Figure 3:
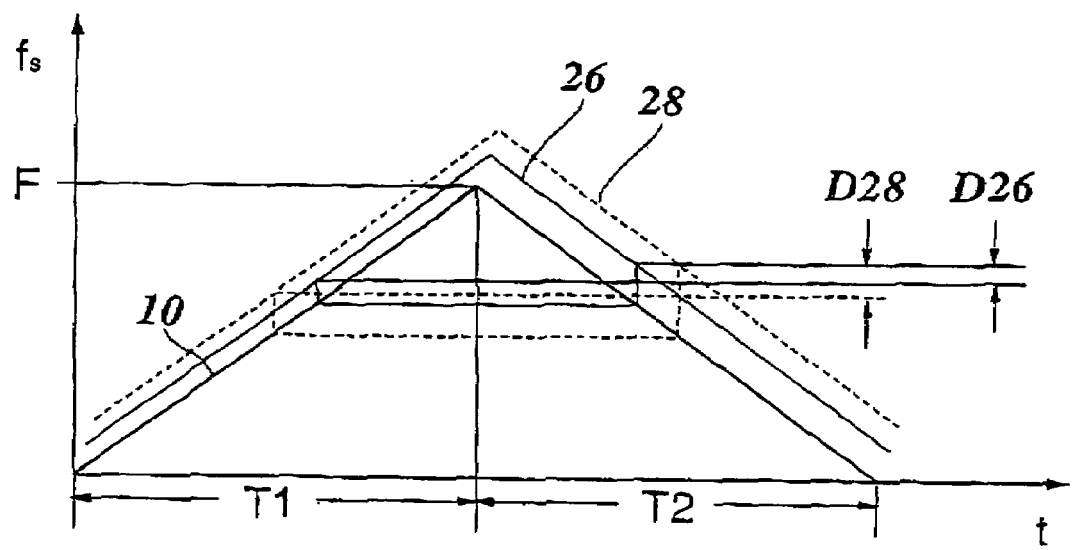
FIG. 3 shows a diagram for clarifying a method for determining the object distance.

In FIG. 3, in addition to curve 10, curves 26, 28 of two radar echoes, which are received from two different objects, are drawn in. For each curve 26, 28, differences D26 and D28, respectively, between the peak frequencies are indicated on the first and second ramp. This difference is independent of the Doppler shift, and therefore solely represents the propagation time, and thus object distance d.

Figure 4:
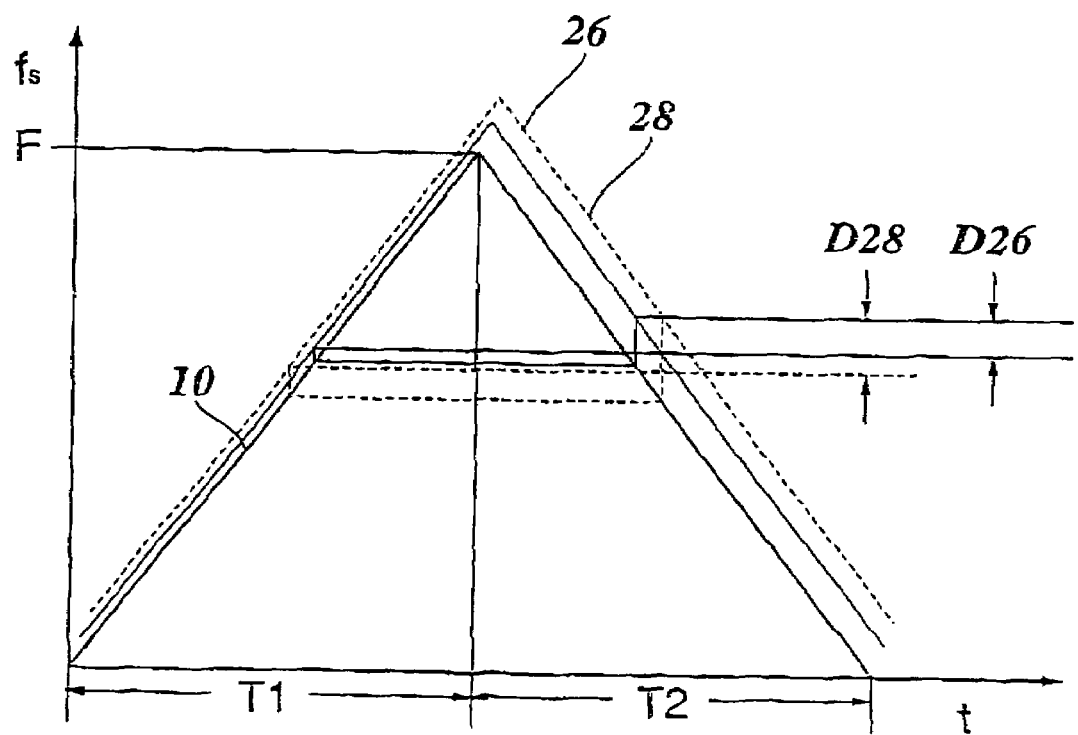
FIG. 4 shows a diagram analogous to FIG. 3, but for a larger frequency deviation of the radar signal.

FIG. 4 shows the same for a larger frequency deviation F. One can see that here, differences D26 and D28 are enlarged proportionally to the frequency deviation, so that the peaks can be differentiated more clearly. The same spread of differences D26 and D28 could also be achieved by reducing the modulation durations and leaving frequency deviation F unchanged, so that the same ramp slopes are attained as in FIG. 4. However, the larger spread would then not lead to a higher resolution, since because of the shorter measuring duration, the peaks would widen accordingly. The decisive parameter for the resolution of the distances is therefore frequency deviation F. In the example described here, in both measurements M1 and M2, use is made of the maximum frequency deviation achievable based on the design of the radar device.

Figure 5:
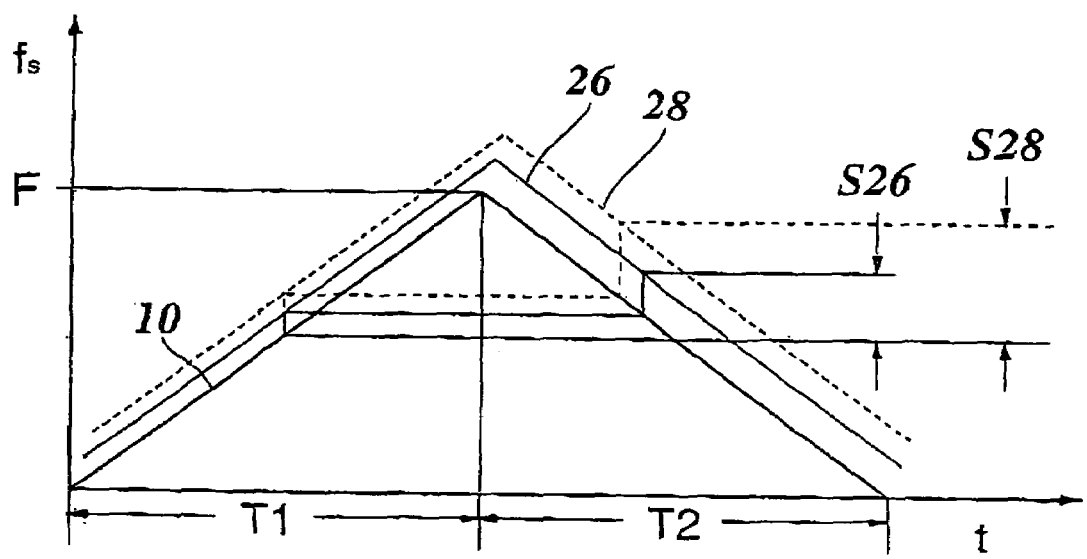
FIG. 5 shows a diagram for clarifying a method for determining the relative velocities of objects.
Figure 6:
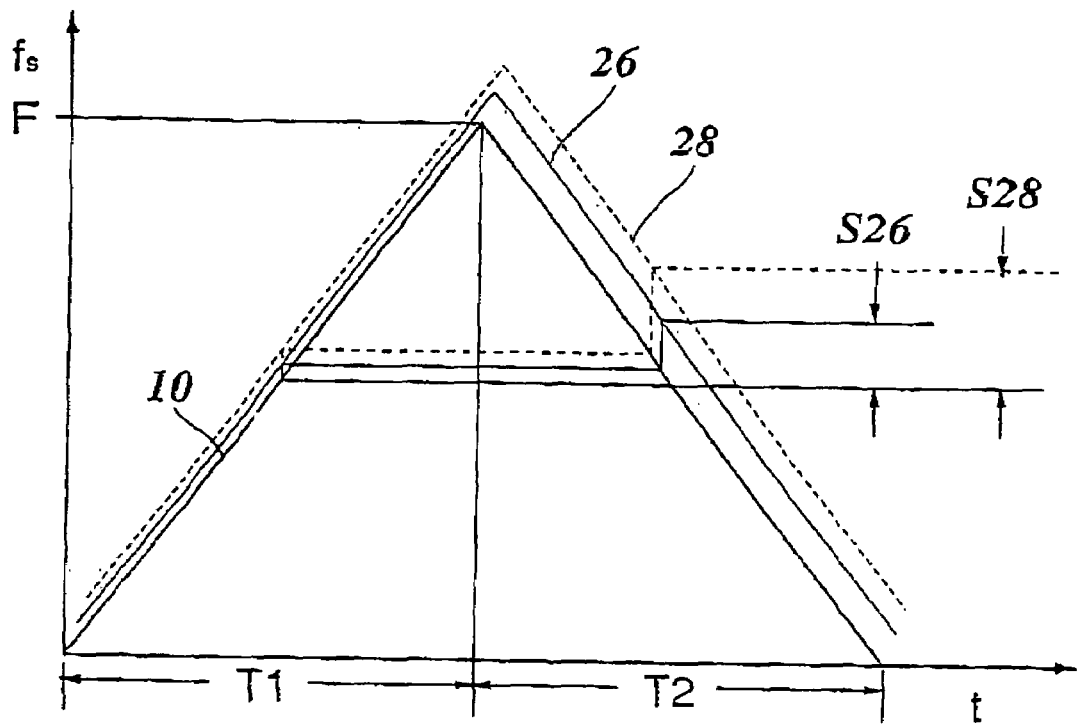
FIG. 6 shows a diagram analogous to FIG. 5, but for a larger frequency deviation of the radar signal.

FIGS. 5 and 6 illustrate that no better resolution with respect to the relative velocities can be achieved by increasing frequency deviation F. In FIG. 5, sums S26 and S28 of the frequency differences are indicated on the two ramps for the two curves 26 and 28. The distance-dependent propagation-time differences have the exactly opposite effect on the frequency difference in the two ramps, and therefore cancel each other out in the summation, so that sums S26 and S28 solely represent the Doppler shift for the objects in question. Since this Doppler shift is not a function of the frequency deviation, sums S26 and S28 in FIG. 6 are not greater than in FIG. 5. Therefore, improved resolution with respect to the relative velocities may only be achieved by longer modulation durations T1, T2.

On the other hand, however, the total cycle time T=T1+T2 should not be too great, so that the objects detected in one measuring cycle are able to be detected again in the next measuring cycle with the aid of a tracking procedure based on similar distances and relative velocities, and so that the movements of the objects may be tracked with high time resolution. In the specific embodiment shown here, it is possible to satisfy these contradictory demands, since only two measurements need to be carried out during one measuring cycle, so that the modulation duration is relatively great (half as great as the cycle duration). However, a matching procedure is needed which, based on the two measurements per measuring cycle, permits the elimination of ambiguities in the detection of a plurality of objects, by correctly allocating the peaks recorded during the first measurement and the peaks recorded during the second measurement to each other.

Figure 7:
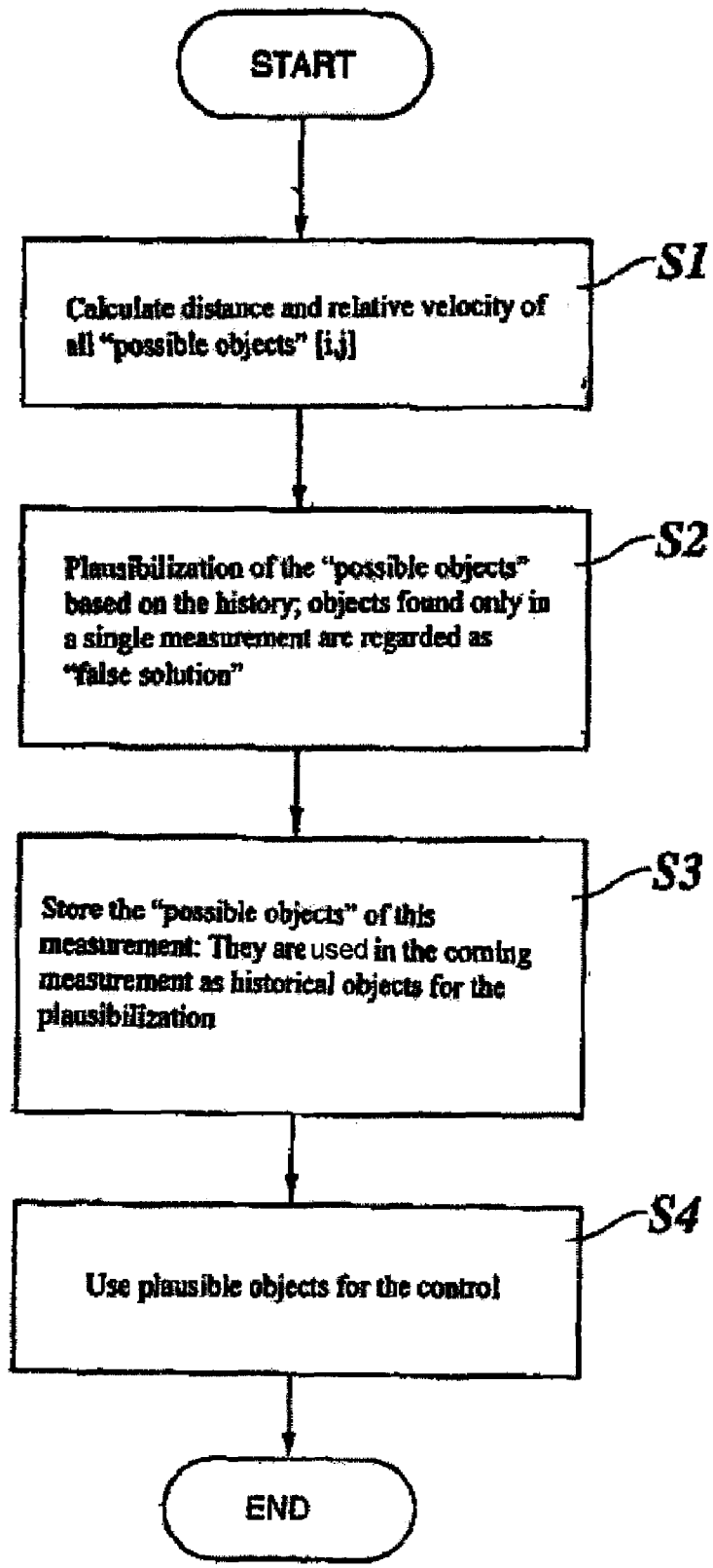
FIG. 7 shows a flow chart for clarifying the general principle of a first specific embodiment of the method according to the present invention.

This is achieved in the method described here by combining the matching procedure with the tracking procedure, as presented in broad outline in FIG. 7.

To that end, in step S1 in FIG. 7, first of all the distances and relative velocities are calculated for all "possible objects" [i, j]. In this context, all pairs [i, j] of peaks are regarded as "possible objects", i being the current number of all peaks from the spectrum recorded in the first measurement M1, and j being the current number of all peaks from the spectrum recorded in measurement M2. If a total of m objects are present, there are m peaks in each spectrum, and the number of possible objects is $m^2$. The real objects are represented by a subset, made up of m pairs, of the quantity of all possible objects.

In step S2, the real objects are differentiated from the unreal objects by utilizing the history, i.e., the results of preceding measurements. In so doing, the criterion is that for real objects, a plausible connection must exist between the results of the current measurement and the results of one of the previous measurements. For example, it is possible to compare the distances and relative velocities from the instantaneous measuring cycle to the distances and relative velocities from the preceding measuring cycle, as is also usually done in a tracking procedure. For real objects, the relative velocities should then be nearly identical, and the difference between the distances must agree approximately with the product of the relative velocity and cycle duration T. Peak pairs for which no partner satisfying these criteria is found in at least one of the preceding measurements are sorted out as "false solution", i.e., as unreal objects. In so doing, however, real objects which were detected by the radar device for the first time in the current measuring cycle are also mistakenly sorted out. So that these objects can be recognized in later measuring cycles, in step S3, the results for all possible objects are stored. For the further evaluation, however, e.g. for the distance control in a motor vehicle, in step S4 only the "plausible" peak pairs recognized as real objects are utilized.

Figure 8:
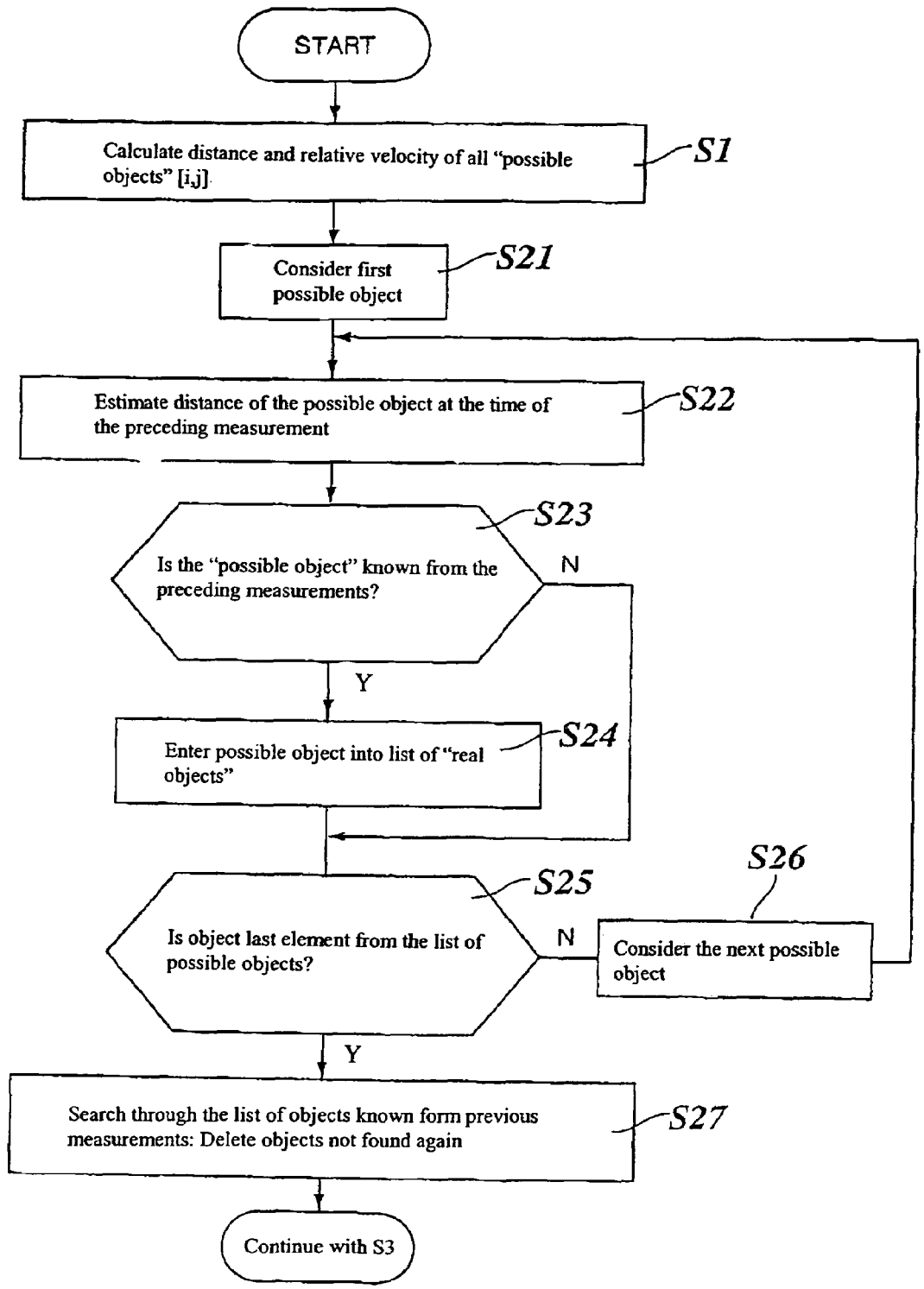
FIG. 8 shows a detailed flow chart of the method according to FIG. 7.

FIG. 8 shows the method sequence in greater detail.

Following step S1, in step S21 the first possible object is selected from the list of all possible objects. In step S22, it is then estimated what distance and what relative velocity this object would have to have had in the preceding measuring cycle. Based on the results which were stored in the preceding measuring cycle in step S3, it is then checked in step S23 whether an object with appropriate distance and appropriate relative velocity is actually found among the objects from the preceding cycle. If this is the case, then in step S24, the object which was selected in step S21 is entered into the list of real objects. Otherwise, the object is discarded.

In step S25, it is checked whether all objects of the instantaneous cycle have already been verified. If this is not the case, in step S26, the next object is selected from the current list and there is a return to step S22. All objects are then verified in this manner one after another in a loop using steps S22-S26. After the last object is checked, the loop is left after step S25.

It is possible that the list of possible objects which was stored in the preceding cycle will still contain objects not found again in the current cycle. These objects are now deleted in step S27. Therefore, in this specific embodiment, only simple tracking is carried out in which the current objects are compared only to the objects from the immediately preceding measuring cycle.

Figure 9:
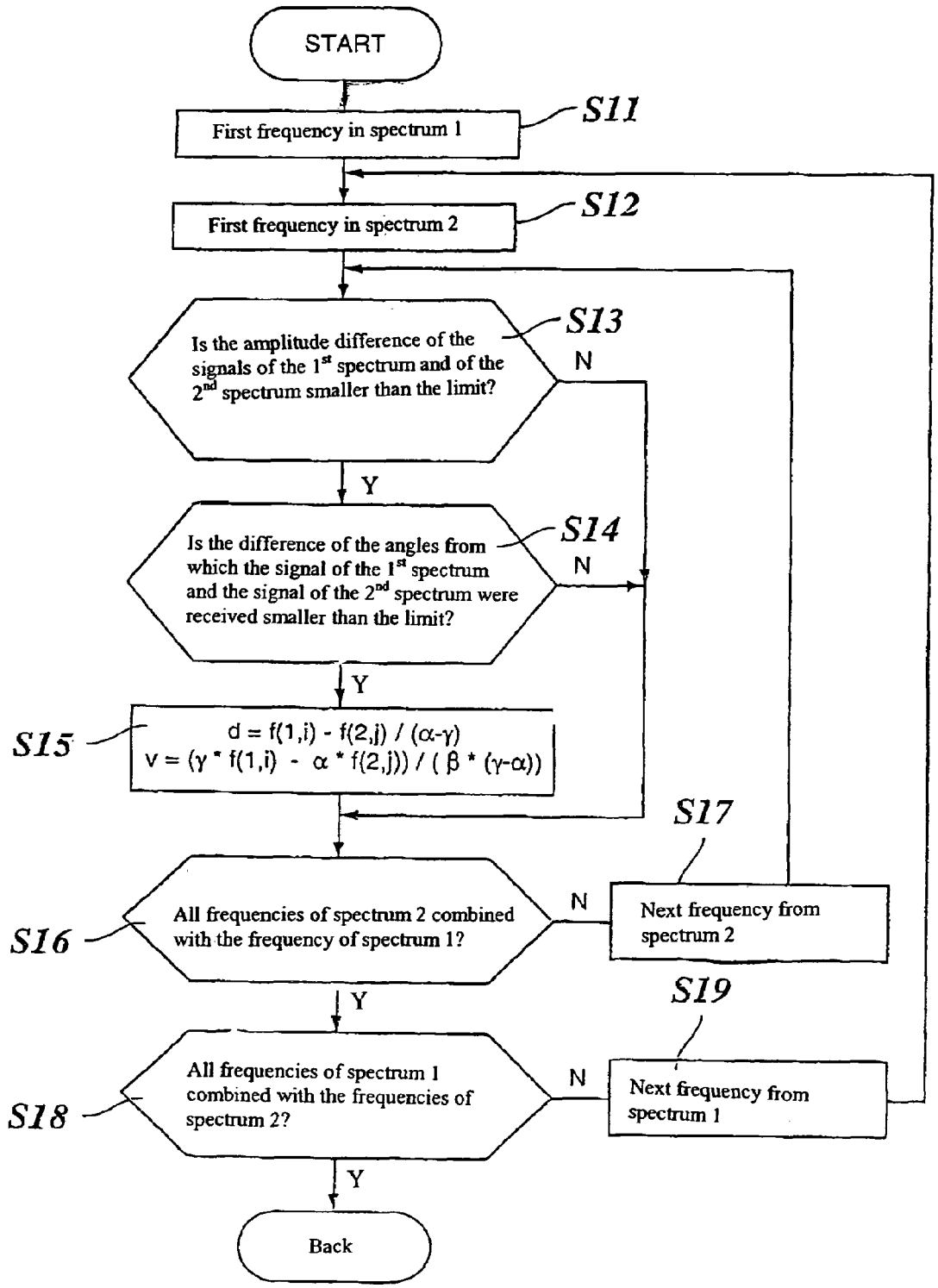
FIG. 9 shows a flow chart of a subroutine in the method according to FIG. 8.

Step S1 in FIGS. 7 and 8 is made up of a subroutine whose flow chart is shown in FIG. 9. In this context, it is assumed that the spectra recorded in the instantaneous cycle during the first measurement and during the second measurement each have a number of peaks corresponding to the number of objects and in each case lying at a certain frequency. Therefore, given m objects, each spectrum contains m frequencies at which a peak is located. In step S11, the first of these frequencies is selected from the first spectrum. Correspondingly, in step S12, the first frequency is selected from the second spectrum. In step S13, a first plausibility check is carried out based on the criterion that the amplitudes in the case of the first frequency in the first spectrum and the first frequency in the second spectrum must have similar values, if the peak pair in question is a real object. If the amplitudes clearly differ, they are obviously not echoes from the same object, so that the peak pair in question may be discarded from the start.

In step S14, a second plausibility check is carried out on the basis of the criterion that the signals which were reflected by the same object must also come from a similar direction. If this criterion is not met for the peak pair being considered, this peak pair may likewise be discarded. The checks in steps S13 and S14 make it possible to reduce the computing expenditure, however are not essential for the method.

In step S15, the actual calculation of distance d and relative velocity v is then carried out for the possible object represented by the peak pair being examined. This calculation is performed by solving the system of equations (2) indicated in the introductory section of the Specification. Here, frequency f (1,i) is the frequency for peak i in the first spectrum, and frequency f (2,j) is the frequency of peak j in the second spectrum. If the plausibility check in step S13 or S14 was negative, step S15 is skipped. Therefore, the calculations in step S15 are not carried out for each combination of peaks, but rather only for those combinations of peaks which are plausible in the sense that they satisfy the criteria checked in steps S13 and S14. Only these peak pairs remain stored in the list of possible objects.

Steps S16 through S19 control the program run in two loops nested in one another, in which all combinations of peaks i and j in the two spectra are checked in succession.

Figure 10:
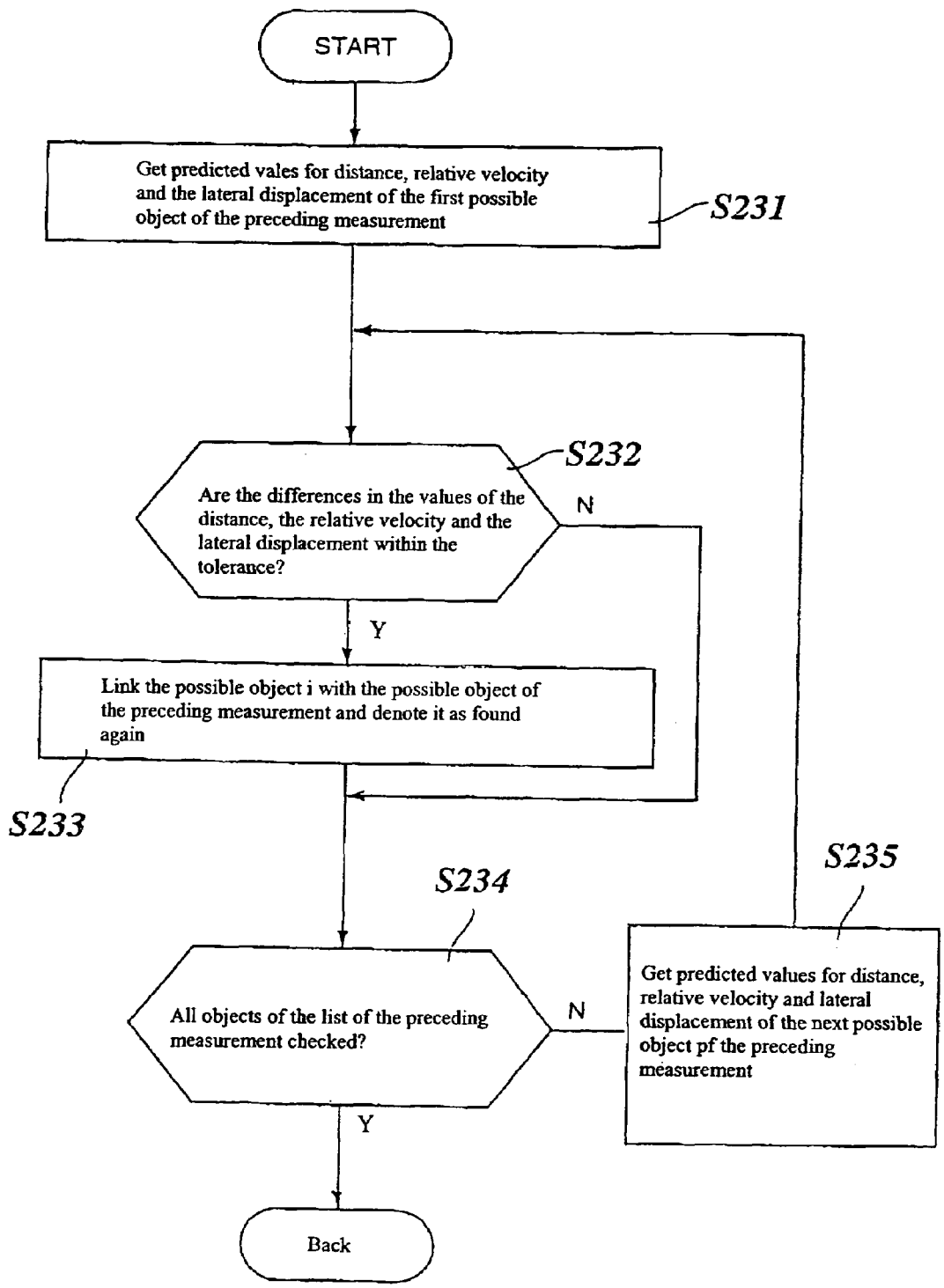
FIG. 10 shows an exemplary embodiment for a further subroutine in the method according to FIG. 8.

After distances d and relative velocities v have been calculated in this way for all possible, at least for all plausible, objects, in light of this data, step S22 in FIG. 8 may be carried out in which, based on the relative velocities, there is a calculation back to find what distances the objects in question had in the preceding measuring cycle. Conversely, it is naturally also possible to proceed so that, based on the distance and velocity data obtained in the instantaneous cycle, the distances and relative velocities to be anticipated for these objects in the next measuring cycle are precalculated. FIG. 10 shows a possible implementation of step S23 in FIG. 8 based on the latter principle.

In step S231, the values predicted in the preceding measuring cycle for the distance and the relative velocity and optionally also for the lateral displacement of the first possible object are read. In step S232, these predicted values are then compared to the values which were obtained in the instantaneous cycle for the currently observed object (selected in step S21 in FIG. 8). If the deviations are within permissible tolerance limits, in step S233, the two objects are linked to each other (tracking). Otherwise, step S233 is skipped.

Steps S234 and S235 control a loop with which the above-described checks are repeated in succession for each possible object from the previous measuring cycle. If it was possible to link the instantaneous object in step S233 to one of the objects from the previous measuring cycle, then the query in S23 is answered with "yes", and the method is continued with step S24. Otherwise, the query must be answered with "no", and there is a jump to step S25.

Figure 11:
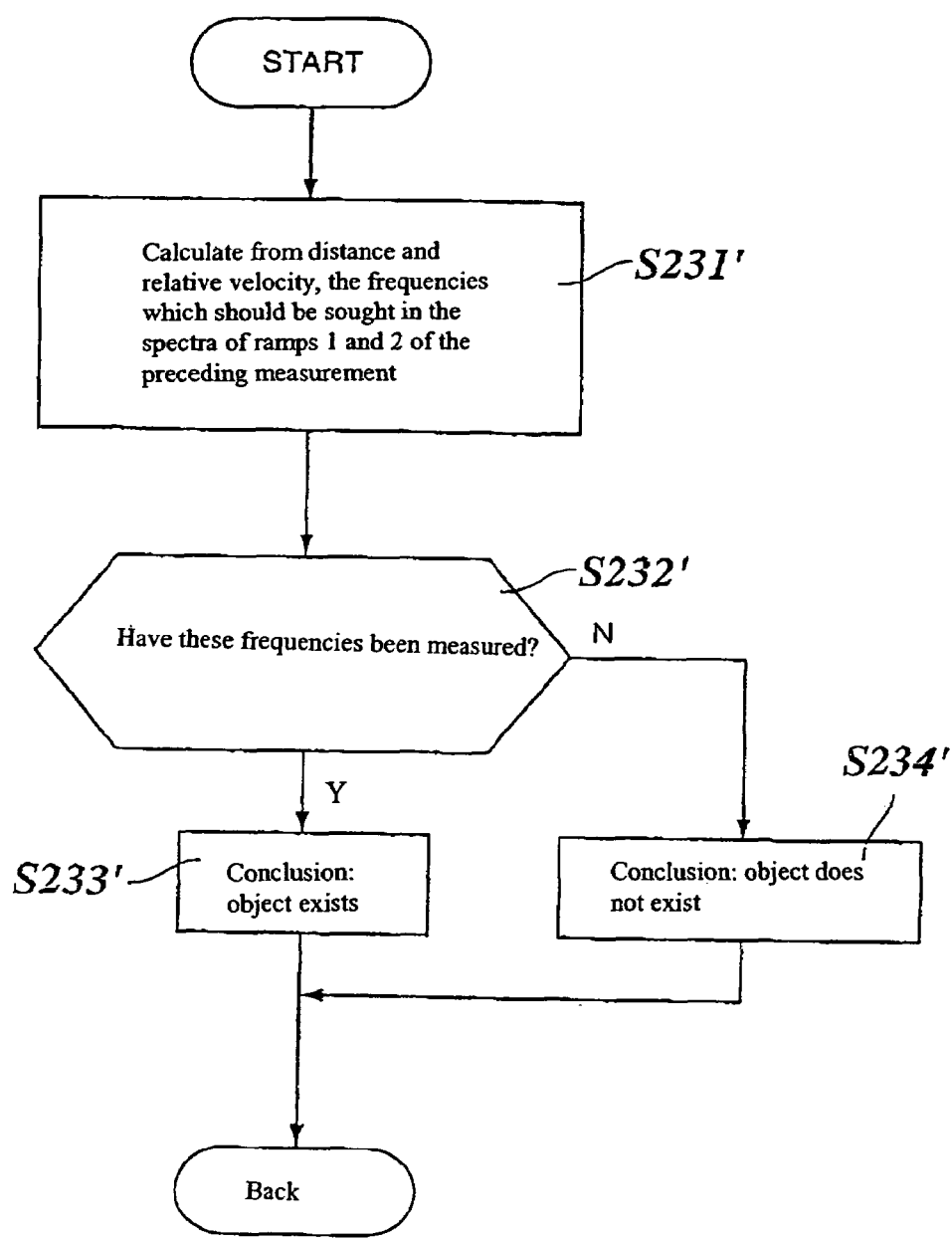
FIG. 11 shows another exemplary embodiment for a further subroutine in the method according to FIG. 8.

FIG. 11 shows another possible implementation of step S23 in FIG. 8. From the distance of the object, estimated in step S22, at the moment of the preceding measuring cycle, and from the relative velocity of this object (assumed as approximately constant), in step S231', the frequencies are calculated at which the peaks in the two spectra recorded in the preceding cycle would have had to be situated. The frequency calculation is performed according to equation (1) indicated in the introductory part of the Specification. In step S232', it is then checked whether these frequencies have actually been measured. If this is the case, step S23 ends with the response "yes" (step S233'), otherwise with the response "no" (step S234').

Naturally, the variant according to FIG. 11 may also be carried out "forwards" by calculating the frequencies to be anticipated for the following measuring cycle.

Figure 12:
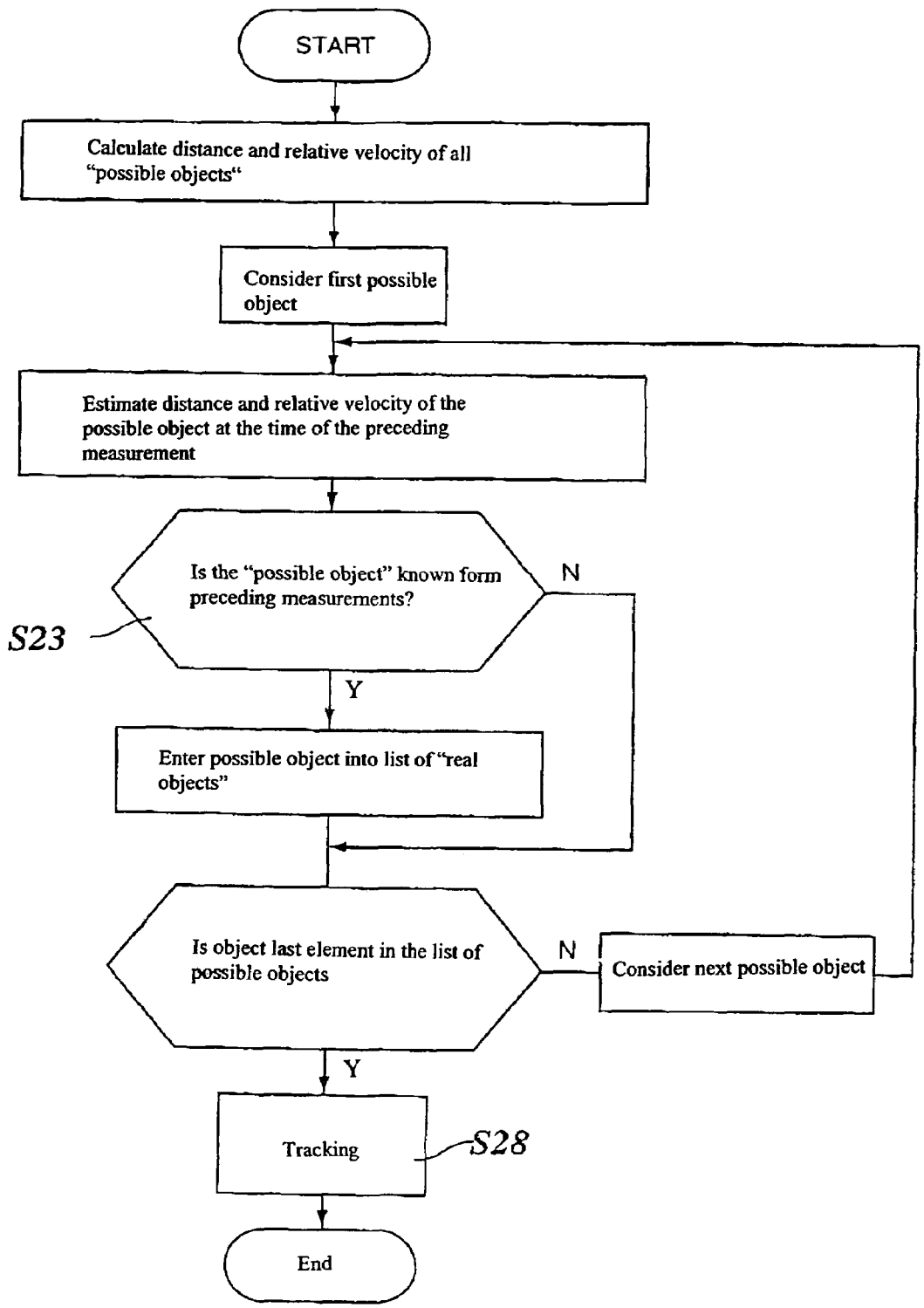
FIG. 12 shows a flow chart for a modification of the method according to FIG. 8.
Figure 13:
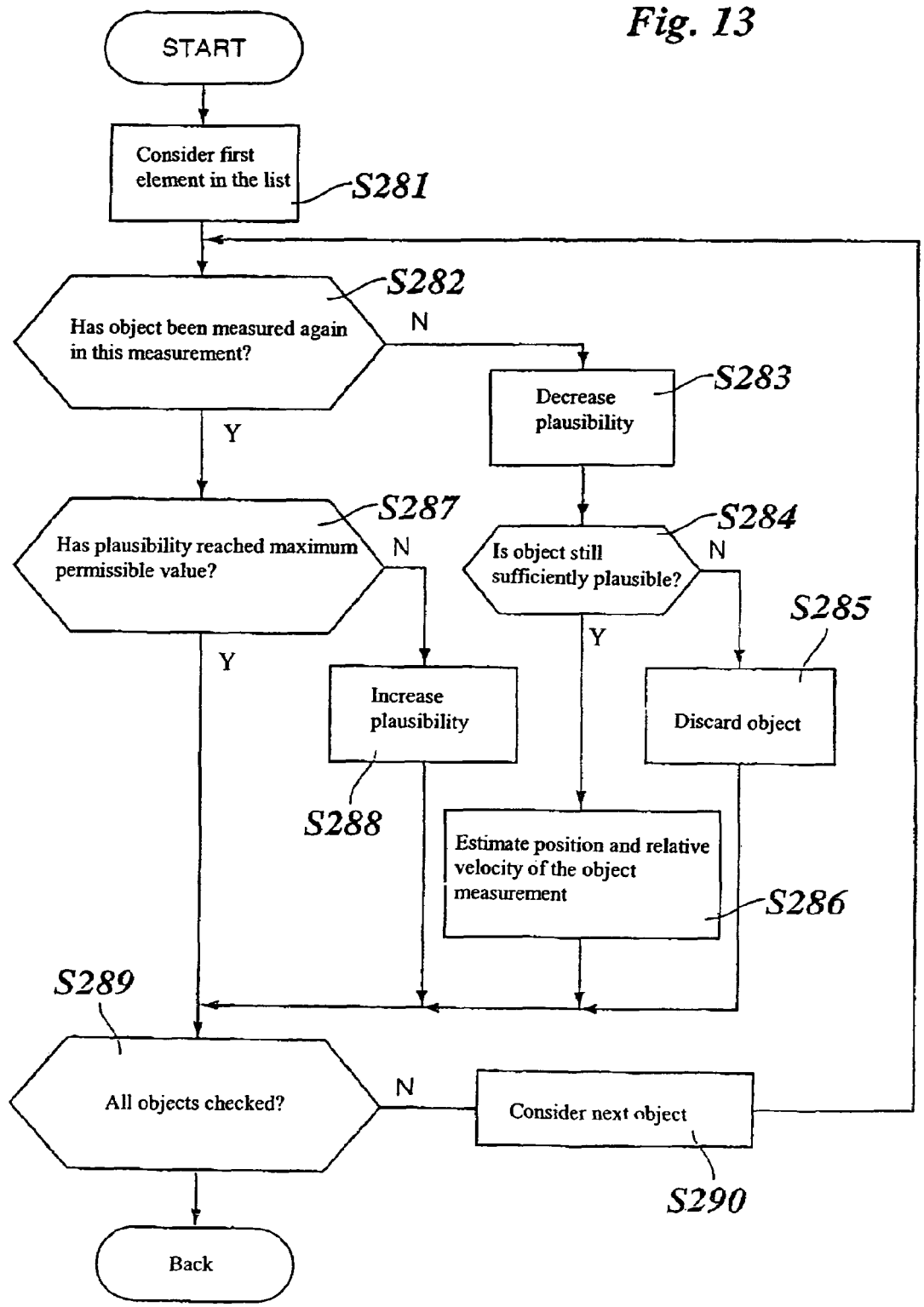
FIG. 13 shows an example for a subroutine in the method according to FIG. 12.

FIG. 12 shows a variant with respect to the program sequence according to FIG. 8. This variant differs from FIG. 8 essentially in that step S27 in FIG. 8 is replaced by a step S28 in which a so-called expanded tracking is carried out. In this context, the check test in step S23 may be performed both according to the method in accordance with FIG. 10 (object matching) and according to the method in accordance with FIG. 11 (frequency matching). FIG. 13 shows one possible implementation of step S28 for the first case.

In FIG. 13, the first element is selected from the list of real objects in step S281. In step S282, it is checked whether this object was found again in the current measuring cycle (positive result in response to the query in step S23). If this is not the case, there is a certain probability that this object has disappeared from the locating range of the radar, i.e., it is less plausible that this object will appear again in later measurements. Accordingly, in step S283, a plausibility parameter for this object is decreased. In step S284, it is then checked whether the plausibility is still above a specific threshold value. If this is not the case, the object is discarded in step S285, i.e., it is permanently removed from the list of real objects.

In the event of a positive result in step S284, the object continues to be handled as a real object, but no current measuring data exists for the distance and the relative velocity. Therefore, this data is estimated in step S286 by extrapolating the previous measuring data.

If the object was found again in step S282, in step S287, it is checked whether the plausibility parameter for this object has already reached an upper limiting value. If this is not the case, the plausibility is increased in step S288. Otherwise, step S288 is skipped.

Steps S289 and S290 again control a loop, in which the above check tests are repeated for each object in the list of real objects.

Figure 14:
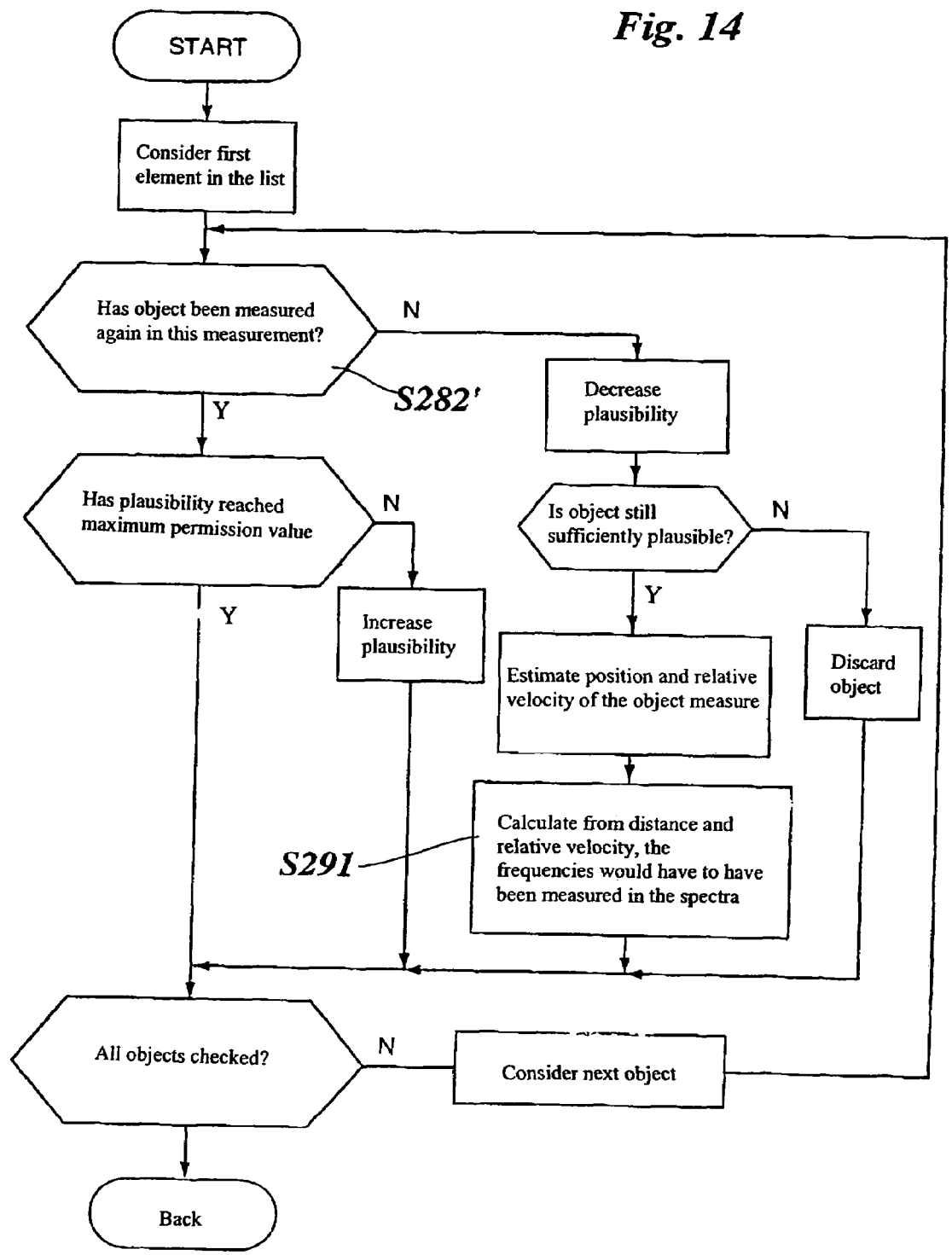
FIG. 14 shows another example for a subroutine in the method according to FIG. 12.

FIG. 14 shows an implementation of step S28 for the case when frequency matching according to FIG. 11 is used in step S23. In comparison to FIG. 13, the subroutine according to FIG. 14 has an additional step S291 in which, from the estimated data for the position and relative velocity of the object not found again, the associated frequencies in the first and second spectrum are calculated. These frequencies are then regarded as "measured" in the next measuring cycle in the case of step S282'.

The expanded tracking in step S28 makes the method more robust with respect to a temporary loss of an object. The more frequently the object is found again, the higher its plausibility becomes—up to an upper limiting value. Temporary loss of the object leads to a reduction in plausibility, and the object remains in the list of real objects until the plausibility has decreased to below a lower limiting value.

With respect to the matching in step S23 and in FIG. 10 or 11, however, a slight modification is necessary in the methods according to FIGS. 12 through 14. During the check test in step S23, it is necessary to take into account not only the immediately preceding measurement, but rather all objects still contained in the list of real objects must be included here as well, even if they were temporarily lost during the immediately preceding measurement. As an alternative, in step S282 (FIG. 13), the check test may be extended to those objects of the current cycle which were initially discarded in step S23. For these objects, step S24 (inclusion in the list of real objects) can then optionally be retrieved.

Another specific embodiment of the method shall now be described with reference to FIGS. 15 through 18.

Figure 15:
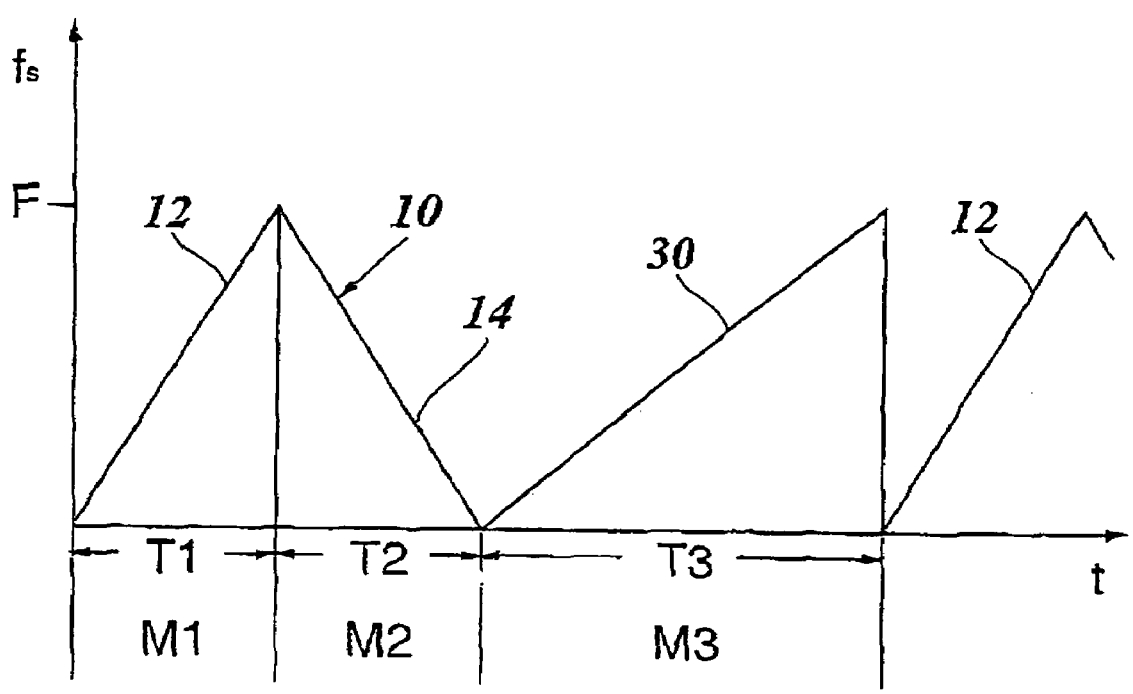
FIG. 15 shops a frequency/time diagram for another specific embodiment of the method.

FIG. 15 shows a modified form of frequency curve 10 in FIG. 1. In this frequency curve, a rising ramp 30 again adjoins falling ramp 14 before the measuring cycle is repeated. Accordingly, three measurements M1, M2 and M3 are carried out here within one measuring cycle. In the third measurement M3, modulation duration T3 is twice as great as in the two other measurements. The slope of ramp 30 is only half as great as for ramp 12. Consequently, frequency deviation F is also at its maximum in third measurement M3. The object distances are therefore able to be measured with optimal resolution in the third measurement, as well. With respect to the relative velocities, because of the greater modulation duration, a resolution is achieved in the third measurement which is twice as high as in measurements M1 and M2. The cycle duration is precisely as great here as in the conventional method, in which four measurements are performed within one cycle. The advantage of the method according to FIG. 15 compared to the conventional method is that the object distances may be measured three times with maximum resolution within one cycle, and the relative velocities even one time with double the resolution.

Instead of the results of measurements M1 and M2 in the preceding cycles or in addition thereto, the result of measurement M3 in the current cycle or in a preceding or subsequent cycle is utilized here for the matching.

Figure 16:
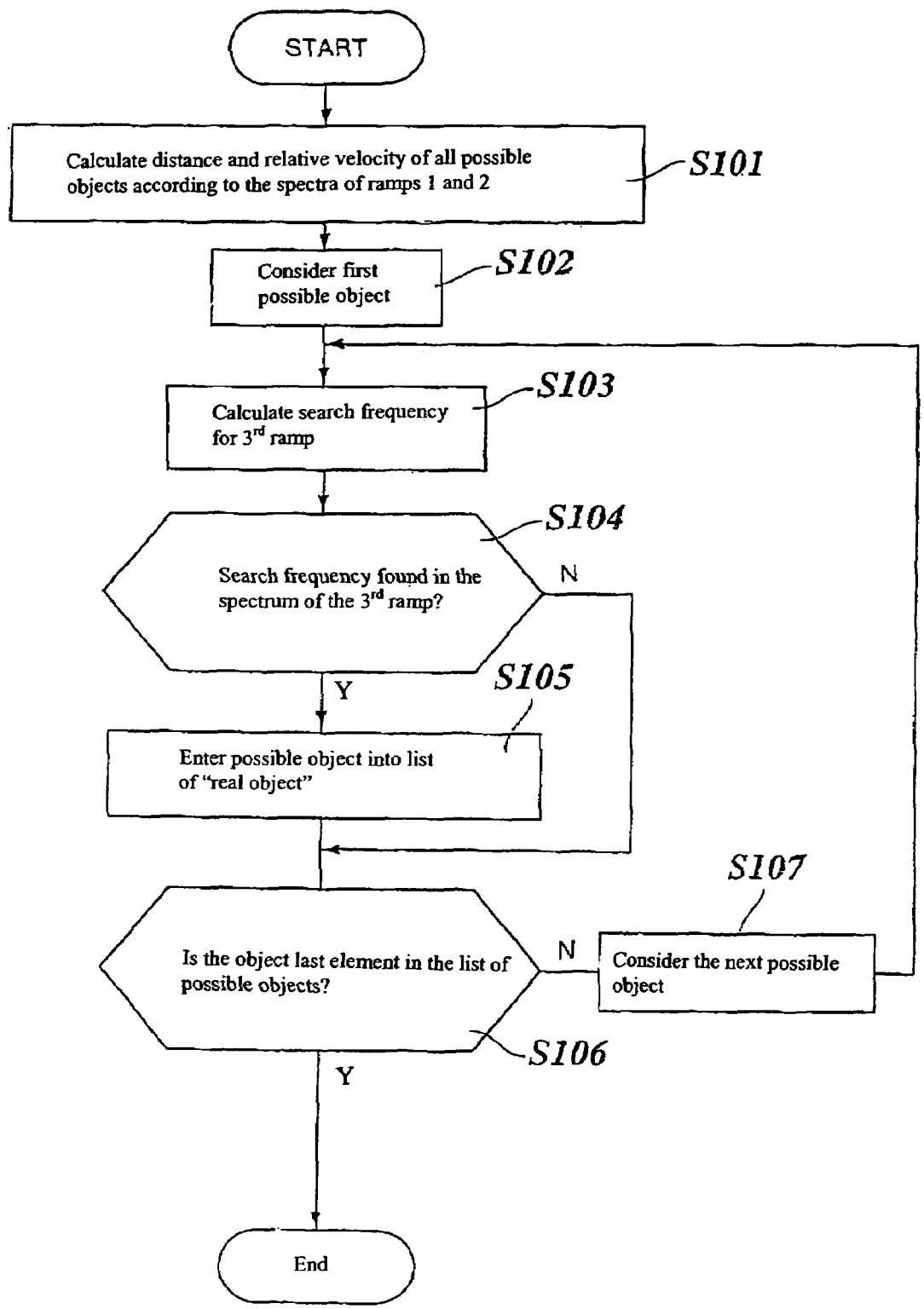
FIG. 16 shows a flowchart for a variant of the method according to FIG. 15.

An example for the method sequence is shown in FIG. 16. Steps S101 and S102 in FIG. 16 correspond to steps S1 and S21 in FIG. 8. In step S103, for each possible object whose distances and relative velocities were calculated in step S101 on the basis of measurements M1 and M2 in the current cycle, the anticipated frequency of the respective peak in the spectrum, which is recorded in measurement M3 for ramp 30, is calculated in accordance with equation (1). In step S104, it is then checked whether a peak is actually found at this frequency in the third measurement. If this is the case, in step S105, the possible object is entered into the list of real objects. Otherwise, step S105 is skipped. Steps S106 and S107 are again used for loop control.

Figure 17:
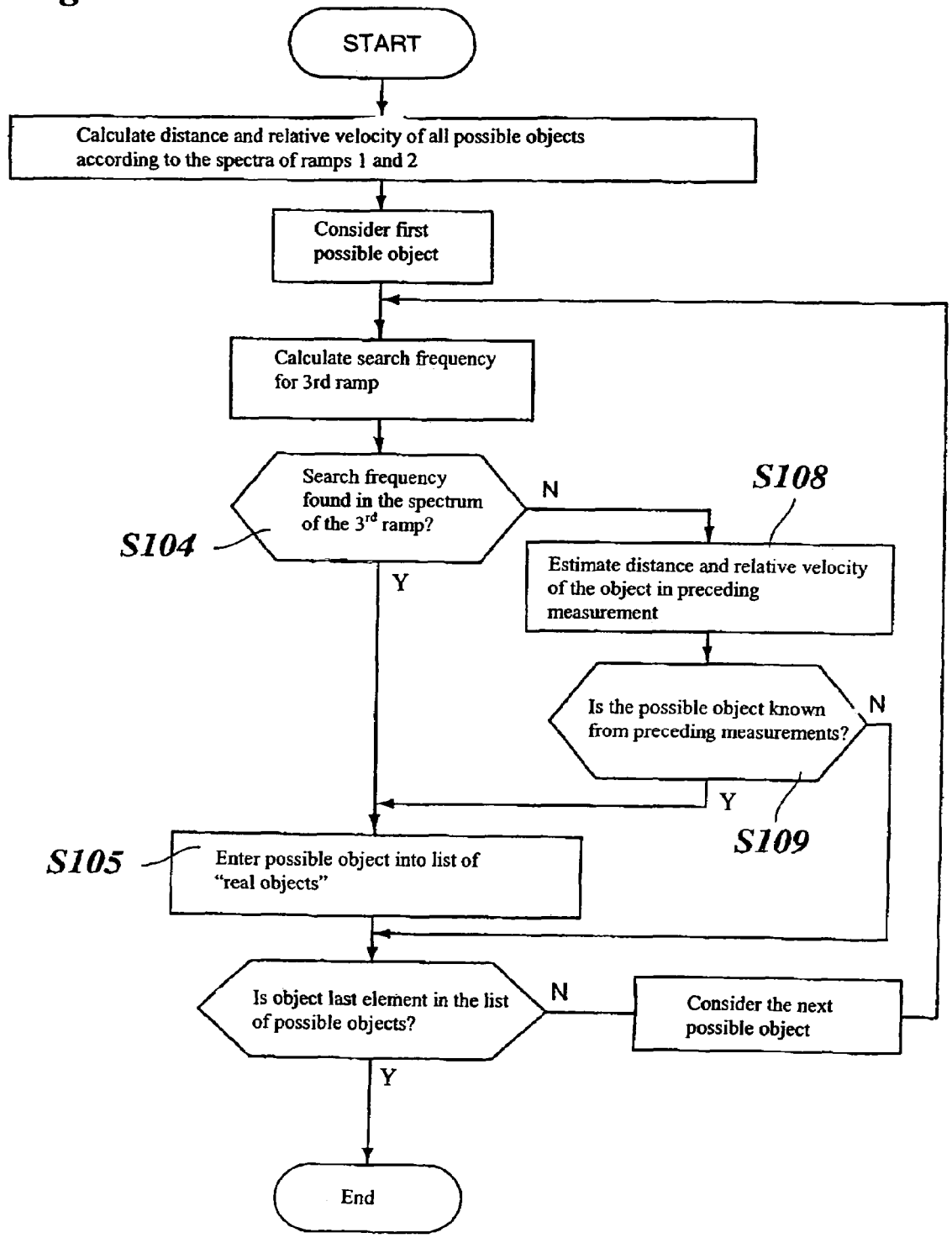
FIG. 17 shows a flowchart for another variant of the method according to FIG. 15.

FIG. 17 shows a variant in which, in comparison to FIG. 16, in response to a negative result of the query in step S104, two steps S108 and S109 are carried out. Here, the matching with the aid of third measurement M3 is supplemented by simple tracking and object matching analogous to FIG. 8. To that end, based on the measured distance and velocity data for the considered object, it is estimated in step S108 what distance and what relative velocity this object had in the preceding measuring cycle. In step S109, it is checked whether an object with this distance and this relative velocity was present in the preceding cycle. If this was the case, step S105 is carried out, although the calculated frequency could not be confirmed in the third measurement. Only if the query in step S109 is also negative, is step S105 skipped.

Figure 18:
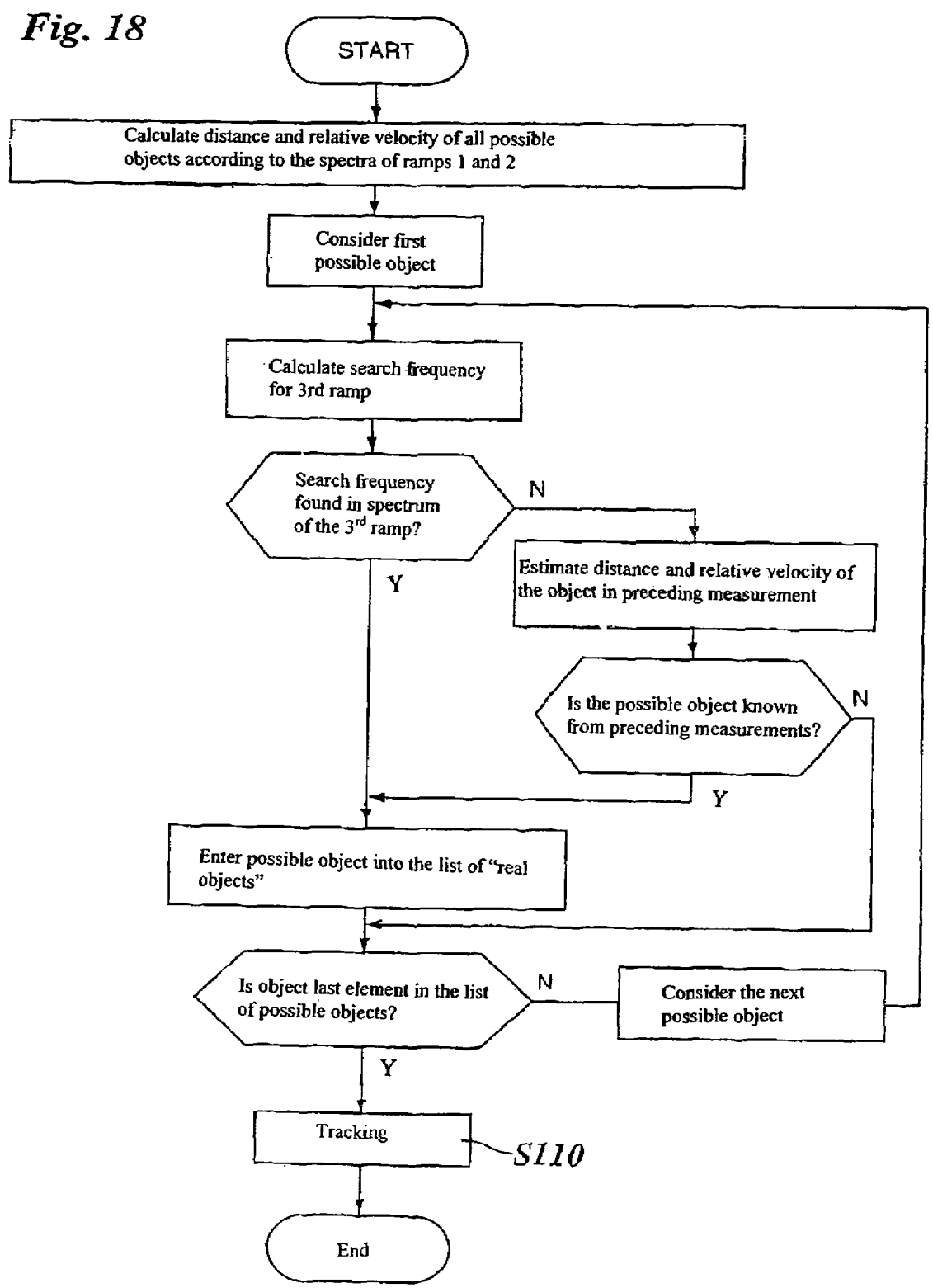
FIG. 18 shows a flowchart for another variant of the method according to FIG. 15.

FIG. 18 shows a modification with respect to FIG. 17 in which additionally, at the end of the procedure, an expanded tracking analogous to FIGS. 12 through 14 is carried out in step S110.

What is claimed is:

1. A method for measuring distance and velocity at a plurality of objects using FMCW radar, the method comprising:

cyclically repeating, in measuring cycles, measurements of the objects using at least two different frequency ramps, wherein in each of the measurements, a transmitted signal is mixed with a received signal to provide a mixed signal, and a spectrum of the mixed signal is recorded;

performing a matching procedure, in which peaks that are in the spectra are recorded for various ramps and that belong to the same object are allocated to each other, and the distances and velocities of the objects are calculated from frequencies of the peaks; and performing a tracking procedure, in which the objects measured at various times are identified with one another based on consistency of their distance and velocity data;

wherein:

each of the measuring cycles includes not more than three measurements with different frequency ramps;

for each plausible combination of two peaks, of which one was recorded during a first measurement and another of which was recorded during a second measurement of the same cycle, a distance and a velocity of one possible object represented by these peaks are calculated;

an anticipated result of at least one further measurement is calculated from the distance and the velocity of the possible object;

the possible object is discarded if at least one anticipated result does not agree with a measured result; and three measurements are performed in each measuring cycle, and the further measurement is a third measurement, in which a modulation duration of the frequency ramp is greater than for the first and second measurements.

2. The method of claim 1, wherein the anticipated result of the further measurement is the frequency of a peak in the spectrum, which is recorded in this measurement.

3. The method of claim 1, wherein an anticipated result is also calculated for the first and second measurement in another measuring cycle and compared to the actual result.

4. The method of claim 1, wherein a comparison with results of the further measurements is performed also for a plurality of successive measuring cycles.

5. A The method for measuring distance and velocity at a plurality of objects using FMCW radar, the method comprising:

cyclically repeating, in measuring cycles, measurements of the objects using at least two different frequency ramps, wherein in each of the measurements, a transmitted signal is mixed with a received signal to provide a mixed signal, and a spectrum of the mixed signal is recorded;

performing a matching procedure, in which peaks that are in the spectra are recorded for various ramps and that belong to the same object are allocated to each other, and the distances and velocities of the objects are calculated from frequencies of the peaks; and performing a tracking procedure, in which the objects measured at various times are identified with one another based on consistency of their distance and velocity data;

wherein:

each of the measuring cycles includes performance of three and not more than three measurements with different frequency ramps;

for each plausible combination of two peaks, of which one was recorded during a first measurement and another of which was recorded during a second measurement of the same cycle, a distance and a velocity of one possible object represented by these peaks are calculated;

an anticipated result of at least one further measurement is calculated from the distance and the velocity of the possible object;

the further measurement is a third measurement, in which a modulation duration of the frequency ramp is greater than for the first and second measurements;

a comparison with results of the further measurements is performed also for a plurality of successive measuring cycles; and each object is assigned a plausibility parameter which is increased when the anticipated result agrees with a measured result from another measuring cycle, and which is reduced when the anticipated result does not agree with any of the measured results, and the object is discarded conditional upon that at least one anticipated result does not agree with a measured result and that the plausibility parameter drops below a predefined threshold value.

* * * * *